(12) United States Patent
Register, III

(10) Patent No.: US 10,473,872 B2
(45) Date of Patent: Nov. 12, 2019

(54) FIBER OPTIC CABLE WITH LARGE-DIAMETER OPTICAL FIBERS

(71) Applicant: Corning Optical Communications LLC, Hickory, NC (US)

(72) Inventor: James Arthur Register, III, Hickory, NC (US)

(73) Assignee: Corning Optical Communications LLC, Hickory, NC (US)

(*) Notice: Subject to any disclaimer, the term of this patent is extended or adjusted under 35 U.S.C. 154(b) by 15 days.

(21) Appl. No.: 14/658,731

(22) Filed: Mar. 16, 2015

(65) Prior Publication Data

US 2015/0268427 A1   Sep. 24, 2015

Related U.S. Application Data

(60) Provisional application No. 61/955,419, filed on Mar. 19, 2014, provisional application No. 62/040,021, filed on Aug. 21, 2014.

(51) Int. Cl.
*G02B 6/44* (2006.01)
*G02B 6/02* (2006.01)

(52) U.S. Cl.
CPC .......... *G02B 6/441* (2013.01); *G02B 6/4404* (2013.01); *G02B 6/4434* (2013.01); *G02B 6/02042* (2013.01); *G02B 6/4413* (2013.01)

(58) Field of Classification Search
CPC .... G02B 6/4404; G02B 6/441; G02B 6/4413; G02B 6/4434; G02B 6/02042
See application file for complete search history.

(56) References Cited

U.S. PATENT DOCUMENTS

| 3,823,996 A * | 7/1974 | Kompfner | G02B 6/02042 385/115 |
| 4,644,522 A | 2/1987 | Bagley | |
| 9,335,467 B2 * | 5/2016 | Kokubun | G02B 6/02042 |
| 2011/0052129 A1 * | 3/2011 | Sasaoka | G02B 6/02042 385/126 |
| 2011/0222828 A1 * | 9/2011 | Sasaoka | G02B 6/02042 385/127 |
| 2012/0155814 A1 * | 6/2012 | Leonard | G02B 6/441 385/106 |

(Continued)

FOREIGN PATENT DOCUMENTS

| CN | 102305965 A | 1/2012 |
| CN | 102354036 A | 2/2012 |

(Continued)

OTHER PUBLICATIONS

Patent Cooperation Treaty, Invitation to Pay Additional Fees and, Where Applicable, Protest Fee for PCT/US2015/020873, dated May 29, 2015, 5 pages.

*Primary Examiner* — Daniel Petkovsek
(74) *Attorney, Agent, or Firm* — Tamika A. Crawl-Bey

(57) ABSTRACT

A large and small diameter optical fiber carrying cable is provided. The cable includes a cable body including an inner surface defining a channel within the cable body, a first group of optical fibers comprising a plurality of first optical fibers located within the channel and a second group of optical fibers comprising a plurality of second optical fibers located within the channel. The optical core diameter of the first optical fibers is larger than the optical core diameter of the second optical fibers.

7 Claims, 10 Drawing Sheets

(56) References Cited

U.S. PATENT DOCUMENTS

| | | | |
|---|---|---|---|
| 2012/0213483 A1* | 8/2012 | Risch | G02B 6/44 385/113 |
| 2012/0281955 A1 | 11/2012 | Hudson et al. | 385/103 |
| 2013/0251320 A1 | 9/2013 | Hayashi | 385/100 |
| 2013/0301998 A1 | 11/2013 | Hayashi | 385/100 |
| 2015/0086157 A1* | 3/2015 | Fontaine | G02B 6/14 385/28 |
| 2015/0234120 A1* | 8/2015 | Uemura | G02B 6/03611 385/124 |

FOREIGN PATENT DOCUMENTS

| | | | |
|---|---|---|---|
| FR | 2704071 A1 | | 10/1994 |
| JP | 06323818 A | * | 11/1994 |

\* cited by examiner

FIBER OPTIC CABLE WITH LARGE-DIAMETER OPTICAL FIBERS

CROSS-REFERENCE TO RELATED APPLICATIONS

This application claims the benefit of priority under 35 U.S.C. § 119 of U.S. Provisional Application Ser. No. 61/955,419, filed on Mar. 19, 2014, and U.S. Provisional Application Ser. No. 62/040,021, filed Aug. 21, 2014, the content of each of which is relied upon and incorporated herein by reference in their entirety.

BACKGROUND

The disclosure relates generally to optical cables and more particularly to optical cables having at least two optical fiber types in which one optical fiber is larger than the other optical fiber. Optical cables have seen increased use in a wide variety of electronics, sensing and telecommunications fields. Optical cables contain or surround one or more optical communication fibers. The cable provides structure and protection for the optical fibers within the cable.

SUMMARY

One embodiment of the disclosure relates to a large and small diameter optical fiber carrying cable. The cable includes a cable body including an inner surface defining a channel within the cable body and a first group of optical fibers comprising a plurality of first optical fibers located within the channel. Each of the first optical fibers has an optical core having a first core diameter. The cable includes a second group of optical fibers comprising a plurality of second optical fibers located within the channel, and each of the second optical fibers has an optical core having a second core diameter. The first core diameter is larger than the second core diameter. The first group of optical fibers and the second group of optical fibers form a pattern within the channel such that each of the first optical fibers is next to at least one of the second optical fibers in at least one direction within the cable.

An additional embodiment of the disclosure relates to an optical cable. The cable includes an outer body layer including an inner surface defining a channel within the outer body layer. The cable includes a first optical transmission element located within the channel and including a first optical core having a first core diameter. The cable includes a second optical transmission element located within the channel and including a second optical core having a second core diameter. The first core diameter is greater than the second core diameter.

An additional embodiment of the disclosure relates to a large and small diameter optical fiber containing cable. The cable includes a cable body including an inner surface defining a channel within the cable body. The cable includes a first group of optical transmission elements including a plurality of first optical transmission elements located within the channel, and each of the first optical transmission elements has an optical core having a first diameter. The cable includes a second group of optical transmission elements including a plurality of second optical transmission elements located within the channel, and each of the second optical transmission elements has an optical core having a second diameter. The first diameter is greater than the second diameter. The first diameter is between 125 micrometers and 1000 micrometers and the second diameter is between 125 micrometers and 1000 micrometers. The first group of optical transmission elements and the second group of optical transmission elements form a pattern within the channel such that each of the first optical transmission elements is next to at least one of the second optical transmission elements in at least one of a circumferential direction within the channel and a direction along a radial line extending from a center axis of the channel to the inner surface of the channel.

In accordance with yet other aspects of the present invention, a fiber optic cable includes optical fibers having a glass core, a glass cladding, and a polymeric coating directly overlaying the glass cladding, wherein the optical fibers comprise large-diameter optical fibers having outer diameters of at least 400 micrometers, wherein the cladding of the large-diameter optical fibers is at least 175 micrometers in diameter, and wherein the optical fibers further comprise smaller-diameter optical fibers having outer diameters of about 250 micrometers or less, and wherein the cladding of the smaller-diameter optical fibers is less than 150 micrometers. Tubes support the optical fibers, wherein the tubes have about the same diameter as one another, wherein the large-diameter optical fibers are supported in some of the tubes and the smaller-diameter optical fibers are supported in others of the tubes, wherein the tubes supporting the large-diameter optical fibers are stranded with the tubes supporting the smaller-diameter optical fibers, and wherein the strand has a repeating profile with an average lay length of the strand between about 300 millimeters and 1000 millimeters. A jacket surrounds the tubes and defines an exterior of the cable.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
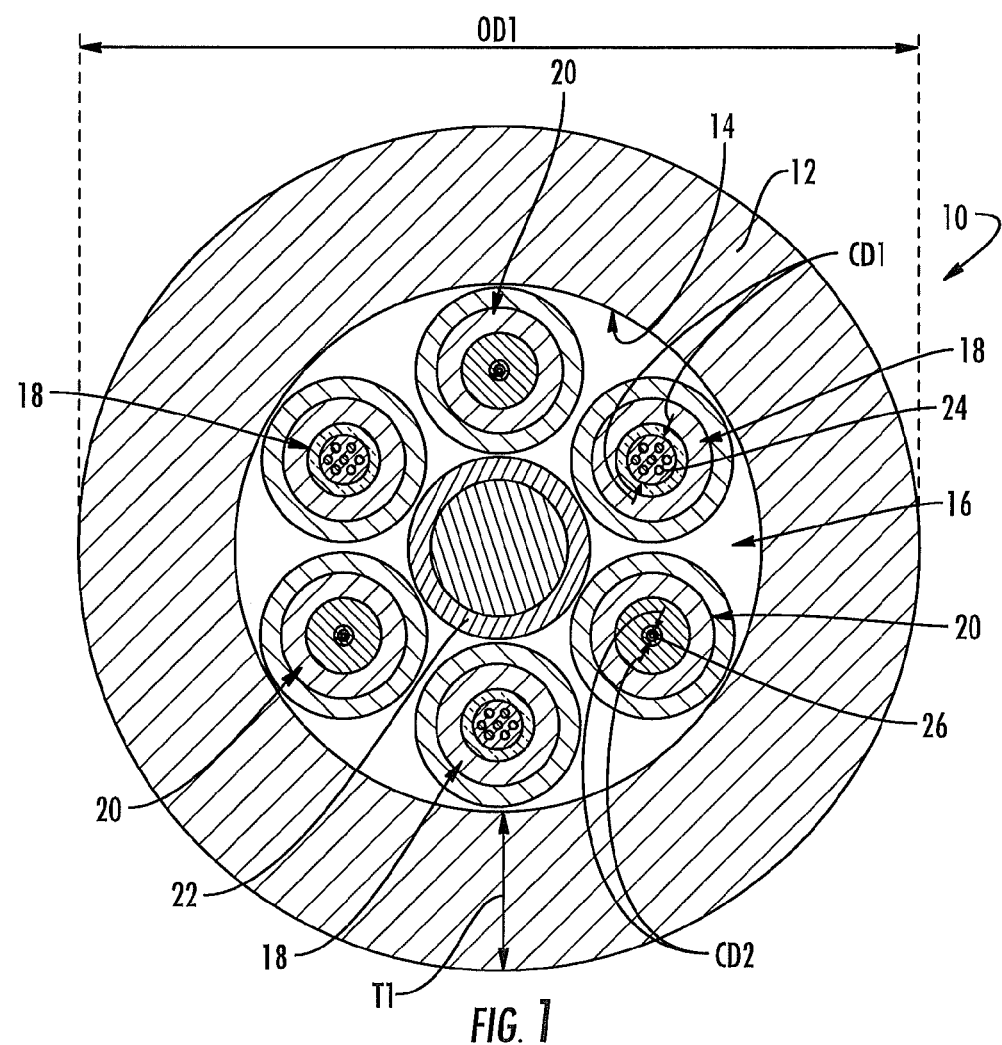
FIG. 1 is a cross-sectional view of an optical fiber cable according to an exemplary embodiment.

Referring generally to the figures, various embodiments of an optical cable (e.g., a fiber optic cable, an optical fiber cable, etc.) are shown. In general, the cable embodiments disclosed herein include both large diameter optical fibers and small diameter optical fibers located within a single outer body layer (e.g., a cable jacket). In general, the physical performance of optical fibers, such as bend characteristics and strain characteristics, depends at least in part on the diameter of the optical core (typically formed from glass) of the optical fiber. Thus, the various cable embodiments discussed herein are configured to provide suitable physical performance for both fiber sizes located within the cable. For example, in various embodiments discussed herein, the cable components are structured and arranged such that physical characteristics of the cable (e.g., bend radius, bend strain, crush-performance, preferential bending, etc.) are suitable for handling and installation despite the different sized optical fibers within the cable.

In exemplary embodiments, the large and small diameter optical cables are arranged in a pattern in which a large diameter fiber is located adjacent to a small diameter optical cable in at least one direction within the cable. For example, in various embodiments, the larger diameter and small diameter optical fibers are arranged in an alternating pattern in a circumferential layer within the cable jacket such that preferential bending is reduced or eliminated. In some such embodiments, pairs of a large diameter fiber and a small diameter fiber are supported by polymer ribbon bodies within the cable jacket to facilitate break out and routing of fiber pairs.

In some other embodiments, the large diameter optical fibers are arranged in an inner circumferential layer including only large diameter optical fibers, and the small diameter optical fibers are arranged in outer circumferential layer including only small diameter optical fibers. In various embodiments, by centrally locating some or all of the large diameter optical fibers, strain experienced by the large diameter fibers during bending may be reduced.

In another embodiment, the cable jacket may define a channel having a major axis and a minor axis in cross-section. In this embodiment, the large diameter fibers are positioned in one or more centrally located rows extending in the direction of the major axis of the channel, and the small diameter fibers are positioned in one more external rows also extending in the direction of the major axis of the channel. In these arrangements, each row of small diameter optical fibers are located between the inner surface of the cable jacket and the row of large diameter fibers, and the row of large diameter fibers is located between the central axis of the channel and the row of small diameter fibers. It is believed that in this embodiment, the relatively flat arrangement of optical fiber rows within the cable jacket provides a cable with good resistance to external crush forces.

Referring to FIG. 1, an optical cable, shown as cable 10, is shown according to an exemplary embodiment. Cable 10 includes an outer body layer, shown as cable body or cable jacket 12, having an inner surface 14 that defines a channel, shown as central bore 16. In general, cable 10 includes a first group of a plurality of large diameter optical transmission elements, shown as large diameter optical fibers 18. Cable 10 includes a second group of a plurality of small diameter transmission elements, shown as small diameter optical fibers 20. Generally, cable 10 provides structure and protection to optical fibers 18 and 20 during and after installation (e.g., protection during handling, protection from elements, protection from vermin, etc.). In various embodiments, cable 10 may utilize one type of fiber to transmit signals to and the other type of fiber to receive signals from a wide variety of electronics equipment, such as cameras, sensors, medical imaging equipment, etc.

As shown in FIG. 1, large diameter optical fibers 18 and small diameter optical fibers 20 are located within channel 16 in a pattern in which each large diameter optical fiber 18 is located next to at least one small diameter optical fiber 20 in at least one direction within the channel 16. As used herein in describing the positioning of optical fibers of the various embodiments, the term "next to" refers to the next optical fiber encountered in the direction modifying the term "next to." For example, as shown in the embodiment shown in FIG. 1, large diameter optical fibers 18 and small diameter optical fibers 20 are located in a circumferentially extending layer in which large diameter optical fibers 18 and small diameter optical fibers 20 alternate within the layer, such that each large diameter optical fiber 18 is next to a small diameter optical fiber 20 in the circumferential direction. By alternating large and small diameter optical fibers in the circumferential direction, cable 10 exhibits little or no preferential bending characteristics.

In various embodiments, cable 10 includes an elongate rod or strength member, shown as central strength member 22. As shown in FIG. 1, large diameter optical fibers 18 and small diameter optical fibers 20 are positioned in the circumferentially extending layer around central strength member 22. In various embodiments, central strength member 22 is formed from a material such as glass-reinforced plastic or metal (e.g., steel). In one embodiment, large diameter fibers 18 provide anti-buckling characteristics to cable 10, and in some such embodiments, cable 10 does not include separate anti-buckling strength elements.

In various embodiments, large diameter optical fibers 18 and small diameter optical fibers 20 are wrapped around central strength member 22 in a stranding pattern, such as an SZ stranding pattern or a helical pattern. In the specific embodiment shown, cable 10 includes three large diameter optical fibers 18 and three small diameter optical fibers 20, but in other embodiments, cable 10 may include less than three or more than three of each type of optical fiber.

As used herein, reference to a "large diameter" and a "small diameter" optical fiber refers to the size of the optical core, typically formed from a glass material, that carries the optical signals within the optical fiber. As shown in FIG. 1, large diameter optical fibers 18 each have an optical core 24, and small diameter optical fibers 20 each have an optical core 26. In general, and as discussed in more detail below, the optical fibers include one more layer (e.g., cladding layer, outer polymer coating layers, etc.) surrounding the optical core of each optical fiber.

In general, large diameter optical core 24 has a core diameter, shown as CD1, and small diameter optical core 26 has core a diameter, shown as CD2. In general, CD1 is greater than CD2, and in various embodiments, CD1 is at least 10% greater than CD2, and more specifically is 50% greater than CD2. In some such embodiments, CD1 is between 125 micrometers and 1000 micrometers, and CD2 is between 125 micrometers and 1000 micrometers. In a specific embodiment, CD1 is at least twice CD2.

In various embodiments, CD1 is greater than 400 micrometers, and CD2 is less than 400 micrometers, and in another embodiment, CD1 is greater than 500 micrometers, and CD2 is less than 300 micrometers. In various embodiments, CD1 is between 400 micrometers and 1000 micrometers, and CD2 is between 50 micrometers and 400 micrometers, and in another embodiment, CD1 is between 500 micrometers and 700 micrometers, and CD2 is between 100 micrometers and 300 micrometers. In another embodiment, CD1 is about 600 micrometers (e.g., 600 micrometers plus or minus 1%), and CD2 is about 200 micrometers (e.g., 200 micrometers plus or minus 1%), In various embodiments, cable 10 may include additional structures and elements within channel 16 as may be needed for a particular cable application. For example, cable 10 may include a binding structure (e.g., helically wound binding yarn or tape, thin-film extruded sheath, etc.) that is positioned around large diameter optical fibers 18 and small diameter optical fibers 20 to hold these elements in position around strength member 22. In various embodiments, such as outdoor cable embodiments, cable 10 may include a water barrier material, such as water swellable tape or powder within channel 16. In addition, cable 10 may include various tensile strength fibers, such as aramid yarn fibers, located within channel 16. In various embodiments, cable 10 may include a reinforcement sheet or layer, such as a corrugated armor layer, located within channel 16 and surrounding optical fibers 18 and 20, and in such embodiments, the armor layer generally provides an additional layer of protection to optical fibers 18 and 20 within cable 10, and may provide resistance against damage (e.g., damage caused by contact or compression during installation, damage from the elements, damage from rodents, etc.). In other embodiments, such as cables for indoor use, cable 10 may include fire resistant materials, such as fire resistant materials embedded in jacket 12 and/or fire resistant intumescent particles located within channel 16.

In addition to the arrangement of large diameter optical fibers 18 and small diameter optical fibers 20 within cable jacket 12, cable jacket 12 may be sized to provide sufficient structure to cable 10 while also providing for a relatively small and flexible cable. In various embodiments, cable jacket 12 has a thickness shown as T1, and in various embodiments, T1 is between 0.5 mm and 4 mm, specifically between 1 mm and 3 mm and more specifically about 2 mm (e.g., 2 mm plus or minus 0.1 mm). In various embodiments, cable jacket 12 has an outer diameter shown as OD1, and in various embodiments, OD1 is between 6 mm and 18 mm, specifically between 8 mm and 14 mm and more specifically between 10 mm and 13 mm. In a specific embodiment, T1 is about 2 mm (e.g., 2 mm plus or minus 0.1 mm), and OD1 is about 10.3 mm (e.g., 10.3 mm plus or minus 0.1 mm). In another specific embodiment, T1 is about 3 mm (e.g., 3 mm plus or minus 0.1 mm), and OD1 is about 12.5 mm (e.g., 12.5 mm plus or minus 0.1 mm).

Figure 2:
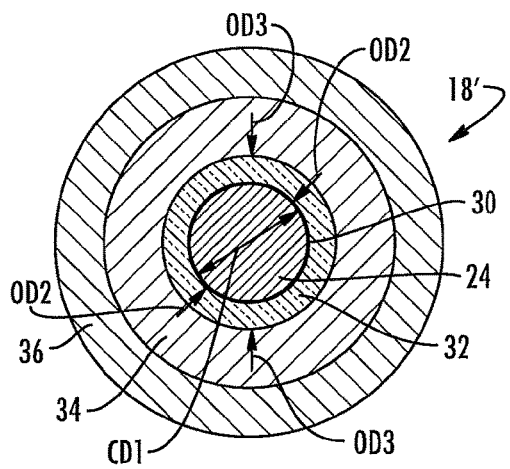
FIG. 2 is a cross-sectional view of a large diameter optical fiber according to an exemplary embodiment.
Figure 3:
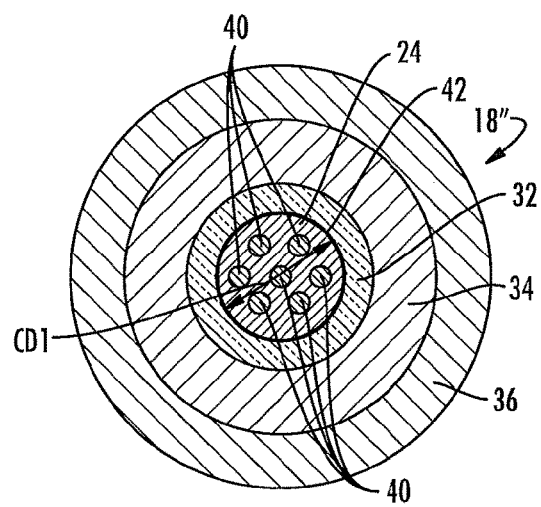
FIG. 3 is a cross-sectional view of a large diameter optical fiber according to another exemplary embodiment.

Referring generally to FIGS. 2 and 3, specific types of large diameter optical fibers are shown according to an exemplary embodiment. Referring to FIG. 2, one specific type of large diameter optical fiber 18, shown as 18', that may be used in the cable embodiments discussed herein is shown according to an exemplary embodiment. In the embodiment of FIG. 2, large diameter optical fiber 18' is a step index optical fiber. As shown, the large diameter optical fiber 18' has a core diameter, shown as CD1, as discussed above. Large diameter optical fiber 18' includes a cladding layer 30 located outside of and surrounding optical core 24. In the embodiment shown, cladding layer 30 has an outer cladding layer diameter, shown as OD2. In various embodiments, cladding layer 30 is a relatively thin cladding layer as compared to the diameter of optical core 24. In various embodiments, OD2 is less than 10% greater than CD1 and more specifically is 5% greater than CD1. In specific embodiments, OD2 is between 600 micrometers and 660 micrometers, specifically is between 620 micrometers and 640 micrometers, and more specifically is about 630 micrometers (e.g., 630 micrometers plus or minus 1%).

In the embodiment shown in FIG. 2, large diameter optical fiber 18' includes a polymer fiber coating layer, shown as layer 32. In general, layer 32 surrounds and is located outside of cladding layer 30. Layer 32 has an outer coating layer diameter, shown as OD3. In various embodiments, coating layer 32 is relatively thin as compared to the diameter of optical core 24. In various embodiments, OD3 is less than 100% greater than CD1 and more specifically is 50% greater than CD1. In specific embodiments, OD3 is between 600 micrometers and 1200 micrometers, specifically is between 800 micrometers and 1200 micrometers, and more specifically is about 900 micrometers (e.g., 900 micrometers plus or minus 1%).

In general, layer 32 is formed from a polymer material, such as a UV curable material, such as an acrylate material. In various embodiments, large diameter optical fiber 18' is a tight buffered optical fiber in which layer 32 serves as the tight buffer. In some embodiments, large diameter optical fiber 18' also includes one or more additional outer layers, shown as layers 34 and 36, in FIG. 2. In some embodiments, layer 34 is a strength element, such as an aramid yarn layer or other suitable strength materials, and layer 36 is polymer jacket, such as a polyurethane layer. In various embodiments, layer 36 can be formed from a variety of suitable jacket materials such as PVC, PVDF, FRPE, etc.

Referring to FIG. 3, another specific type of large diameter optical fiber 18, shown as large diameter optical fiber 18'', is shown according to an exemplary embodiment. In general, the optical fiber of FIG. 3 is substantially the same as the optical fiber of FIG. 2, except as discussed herein. In the embodiment of FIG. 3, large diameter optical fiber 18'' is a multi-core optical fiber. In this embodiment, optical core 24 of large diameter optical fiber 18'' includes multiple signal carrying cores 40 located within a single cladding layer 42. In the embodiment of FIG. 3, optical core 24 combined with the common cladding layer 42 has an outer diameter of OD1, as discussed above. In various embodiments, signal carrying cores 40 may be single mode and/or multimode cores.

Figure 4:
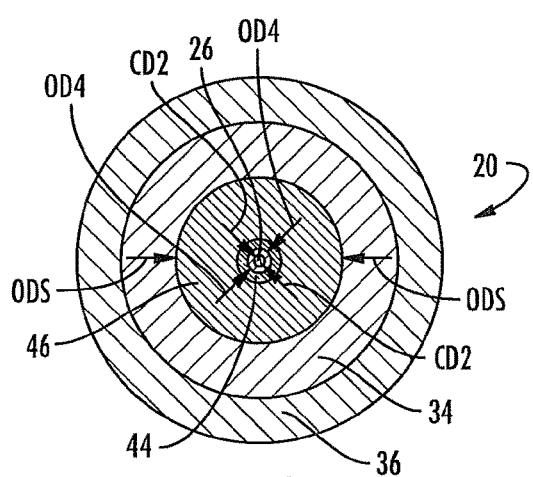
FIG. 4 is a cross-sectional view of a small diameter optical fiber according to an exemplary embodiment.

Referring to FIG. 4, a detailed view of small diameter optical fiber 20 is shown according to an exemplary embodiment. In one embodiment, small diameter optical fiber 20 is a step index optical fiber, and in a specific embodiment, the core diameter of small diameter optical fiber 20, CD2, is about 200 micrometers (e.g., 200 micrometers plus or minus 1 micrometer). In such embodiments, small diameter optical fiber 20 includes a cladding layer 44 located outside of and surrounding optical core 26. In various embodiments, cladding layer 44 has an outer cladding layer diameter, shown as OD4. In certain embodiments, such as step index fiber embodiments, cladding layer 44 is a relatively thin cladding layer as compared to the diameter of optical core 26. In various embodiments, OD4 is less than 20% greater than CD2 and more specifically is 15% greater than CD2. In specific embodiments, OD4 is between 200 micrometers and 250 micrometers, specifically is between 210 micrometers and 240 micrometers, and more specifically is about 230 micrometers (e.g., 230 micrometers plus or minus 1%).

In another embodiment, small diameter optical fiber 20 is telecommunications optical fiber, and in such embodiments, CD2 is between 25 micrometers and 75 micrometers and more specifically is about 50 micrometers (e.g., 50 micrometers plus or minus 1%). In such embodiments, cladding layer 44 is relatively thick compared to the diameter of core 26. In various embodiments, OD4 is more than twice CD2 and more specifically is 2.5 times greater than CD2. In specific embodiments, OD4 is between 100 micrometers and 200 micrometers, specifically is between 110 micrometers and 140 micrometers, and more specifically is about 125 micrometers (e.g., 125 micrometers plus or minus 1%).

In the embodiment shown in FIG. 4, small diameter optical fiber 20 includes a polymer fiber coating layer, shown as layer 46. In general, layer 46 surrounds and is located outside of cladding layer 44. Layer 46 has an outer coating layer diameter, shown as OD5. In various embodiments, coating layer 46 is relatively thick as compared to the diameter of optical core 26. In various embodiments, OD5 is between two times and twenty times CD2. In certain embodiments, such as step index fiber embodiments, OD5 is between two times and six times CD2, and more specifically is 4.5 times CD2. In another embodiment, OD5 is between 15 times and twenty times CD2, and more specifically is 18 times CD2. In various embodiments, OD5 is between 600 micrometers and 1200 micrometers, specifically is between 800 micrometers and 1000 micrometers, and more specifically is about 900 micrometers (e.g., 900 micrometers plus or minus 1%). In a specific exemplary embodiment, for example when CD2 of fiber 20 is 200 micrometers, layer 46 is formed from more than one layer of polymer material. In one such embodiment, a 500 micrometer polymer layer is immediately adjacent cladding layer 44, and a tight buffer layer is located outside of the 500 micrometer layer to bring the total outer diameter of layer 46, OD5, to 900 micrometers. In one such embodiment, the outer portion of layer 46 is a formed from a PVC material to provide desired mechanical properties to fiber 20. In another embodiment, to provide a high temperature fiber 20, the outer portion of layer 46 is a formed from a high temperature compatible material, such as a polyimide.

In various embodiments, coating layer 46 of small diameter optical fiber 20 and coating layer 32 of large diameter optical fiber 18 are sized such that OD3 and OD5 are substantially the same. In a specific embodiment, both OD3 and OD5 are about 900 micrometers. In various embodiments, coating both large diameter optical fibers 18 and small diameter optical fibers 20 so that the outer diameter of the two fiber sizes is substantially the same (despite the difference in optical core size) may provide a cable structure that allows fibers 18 and 20 to be aligned in rows having similar sizes, allows cable 10 to be formed in a substantially circular cross-sectional shape (such as FIG. 1) and/or that evenly distributes bending stress circumferentially around central strength member 22.

Figure 5:
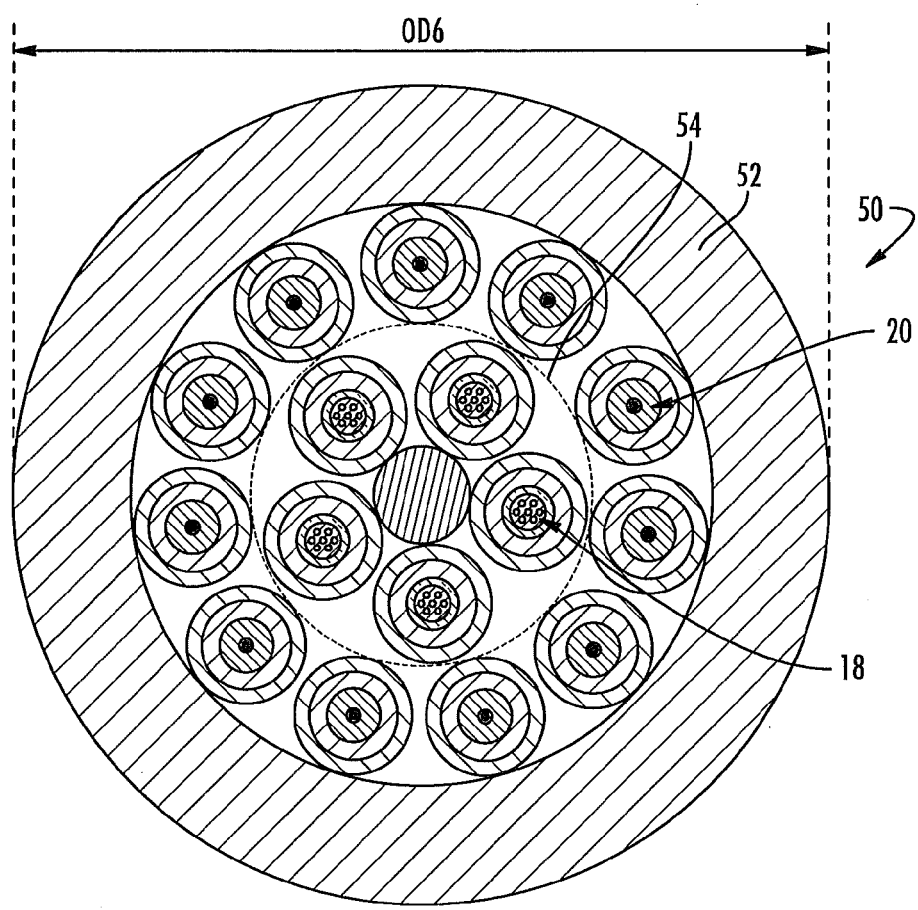
FIG. 5 is a cross-sectional view of an optical fiber cable according to another exemplary embodiment.

Referring generally to FIG. 5, an optical cable, shown as cable 50, is shown according to an exemplary embodiment. Cable 50 is substantially the same as cable 10 except as discussed herein. In general, cable 50 includes a group of large diameter optical fibers 18 wrapped around central strength member 22 such that large diameter optical fibers 18 form an inner most, circumferentially extending fiber layer of cable 50. In addition, cable 50 includes a group of small diameter optical fibers 20 wrapped around and located outside of the inner layer of large diameter optical fibers 18.

In this embodiment, small diameter fibers 20 form an outer, circumferentially extending fiber layer of cable 50, and in this embodiment, fibers 18 and 20 form a pattern in which each large diameter fiber 18 is located next to at least one small diameter optical fiber 20 in the radial direction. In addition, in this embodiment, fibers 18 and 20 form a pattern in which each small diameter optical fiber 20 is located between inner jacket surface 14 and one of the large diameter fiber 18 in the radial direction (e.g., in a direction along a radial line extending from a center axis of channel 16 to inner surface of jacket 52). In the embodiment shown, cable 50 includes five large diameter optical fibers 18 and 11 small diameter optical fibers 20. In various embodiments, cable 50 may include one or more binder layer 54 located around the inner layer of large diameter fibers 18.

Further, because cable 50 includes an additional circumferential fiber layer as compared to cable 10, cable jacket 52 of cable 50 has a larger inner and outer diameter to accommodate the additional fibers, but is otherwise the same as cable jacket 12 discussed above. In various embodiments, cable jacket 52 has an outer diameter shown as OD6, and in various embodiments, OD6 is between 11 mm and 16 mm, specifically between 13 mm and 14 mm and more specifically about 13.7 mm (e.g., 13.7 mm plus or minus 0.1 mm).

Figure 6:
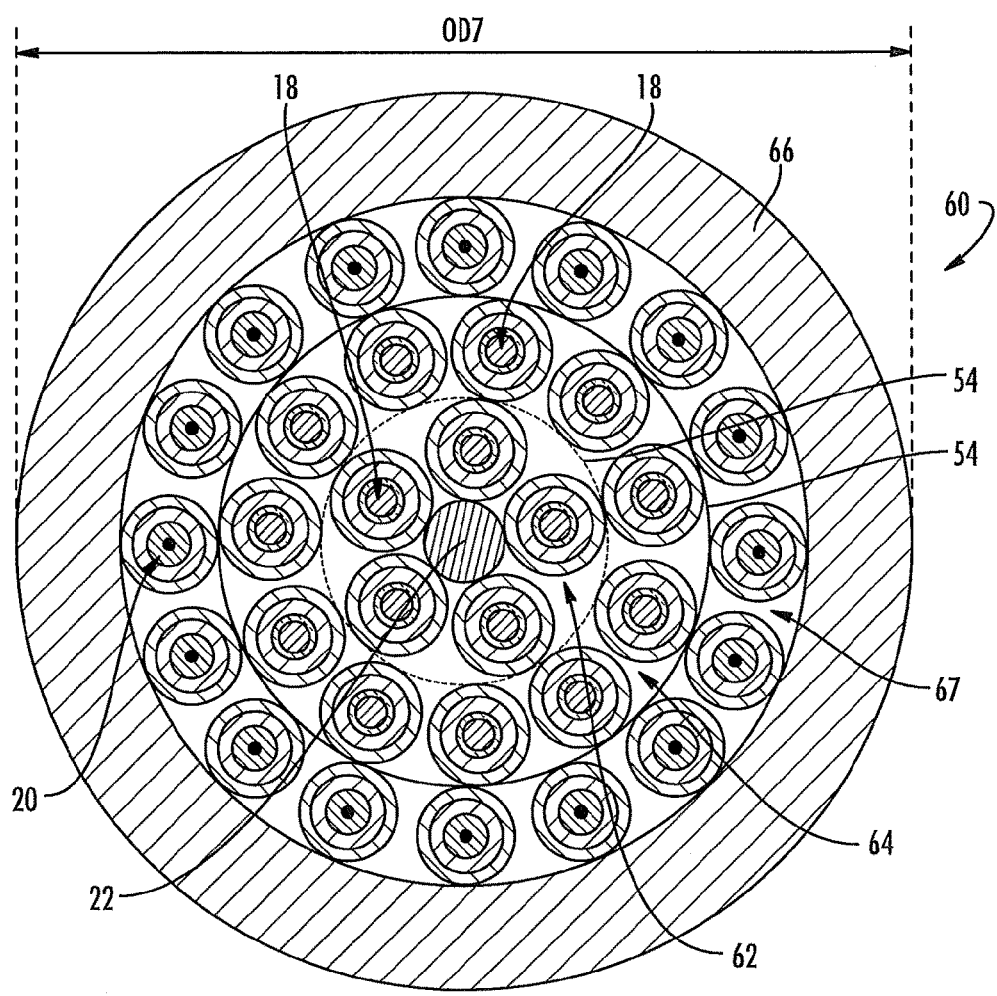
FIG. 6 is a cross-sectional view of an optical fiber cable according to another exemplary embodiment.

Referring generally to FIG. 6, an optical cable, shown as cable 60, is shown according to an exemplary embodiment. Cable 60 is substantially the same as cable 50 except as discussed herein. In general, cable 60 includes a first group 62 of large diameter optical fibers 18 wrapped around central strength member 22 such that the first group 62 of large diameter optical fibers 18 form an inner most, circumferentially extending fiber layer of cable 60. In the embodiment shown, first group 62 includes five large diameter optical fibers 18. In addition, cable 60 includes a second group 64 of large diameter optical fibers 18 wrapped around and located outside of the first group 62 of large diameter optical fibers 18. In the embodiment shown, second group 64 includes 11 large diameter optical fibers 18.

Cable 60 also includes a group 67 of small diameter optical fibers 20 wrapped around and located outside of second group 64 of large diameter optical fibers 18. In this embodiment, small diameter fibers 20 form an outer, circumferentially extending fiber layer of cable 60, and in this embodiment, fibers 18 and 20 form a pattern in which each large diameter fiber 18 of second group 64 is located next to at least one small diameter optical fiber 20 in the radial direction. In addition, in this embodiment, fibers 18 and 20 form a pattern in which each small diameter optical fiber 20 is located between inner jacket surface 14 and one of the large diameter fiber 18 of second group 64 in the radial direction. In the embodiment shown, cable 60 has the same number of large diameter optical fibers 18 as small diameter fibers 20, and specifically includes 16 small diameter optical fibers 20. Cable 60 may also include one or more binder layer 54 located around each fiber layer.

Further, because cable 60 includes an additional circumferential fiber layer and a greater number of optical fibers as compared to cable 50, cable jacket 66 of cable 60 has a larger inner and outer diameter to accommodate the additional fibers, but is otherwise the same as cable jacket 12 discussed above. In various embodiments, cable jacket 66 has a outer diameter shown as OD7, and in various embodiments, OD7 is between 15 mm and 20 mm, specifically between 17 mm and 18 mm and more specifically about 17.7 mm (e.g., 17.7 mm plus or minus 0.1 mm).

Figure 7:
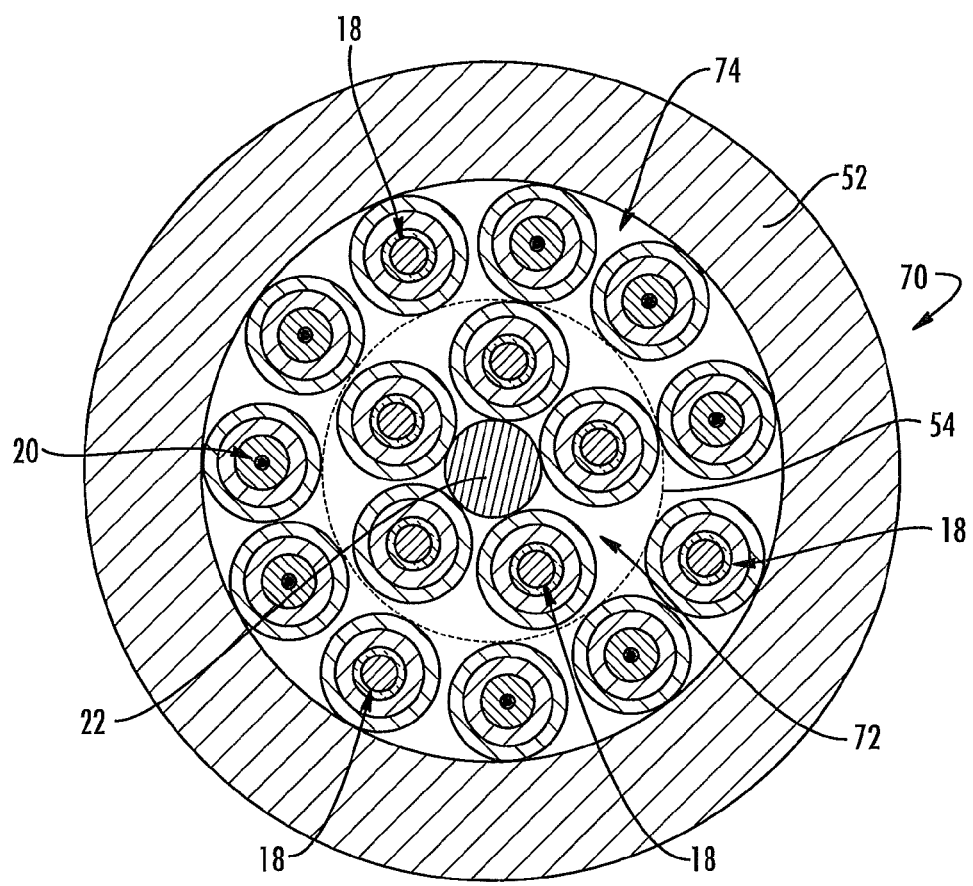
FIG. 7 is a cross-sectional view of an optical fiber cable according to another exemplary embodiment.

Referring generally to FIG. 7, an optical cable, shown as cable 70, is shown according to an exemplary embodiment. Cable 70 is substantially the same as cable 50 except as discussed herein. Unlike cable 50, cable 70 includes the same number of large diameter optical fibers 18 as small diameter optical fibers 20. In this embodiment, cable 70 includes a group of five large diameter optical fibers 18 in the circumferential layer 72 adjacent to central strength member 22, and also includes three large diameter optical fibers 18 located in the outer circumferential layer 74 of optical fibers located adjacent to cable jacket 52. In this embodiment, fibers 18 and 20 form a pattern in which each large diameter fiber 18 of the inner layer 72 is located next to at least one small diameter optical fiber 20 in the radial direction. In addition, in this embodiment, fibers 18 and 20 form a pattern in which each large diameter fiber 18 of the outer layer 74 is located next to at least one small diameter optical fiber 20 in the circumferential direction. In various cable embodiments, such as cables 60 and 70, a balanced number of large and small optical fibers is preferable for paired transmit and receive functionality (e.g., the small fiber acts as a transmit fiber and the large fiber functions as a receive fiber of each pair). In some such embodiments, the larger optical fibers are located in the center optical fiber layer of the cable to lower bending strain. In some embodiments, such as cable 70, not all of the larger optical fibers can fit in the center layer, but by alternating large and small optical fibers in in the outer layer, the stiffness in various planes of bending is balanced.

Figure 8:
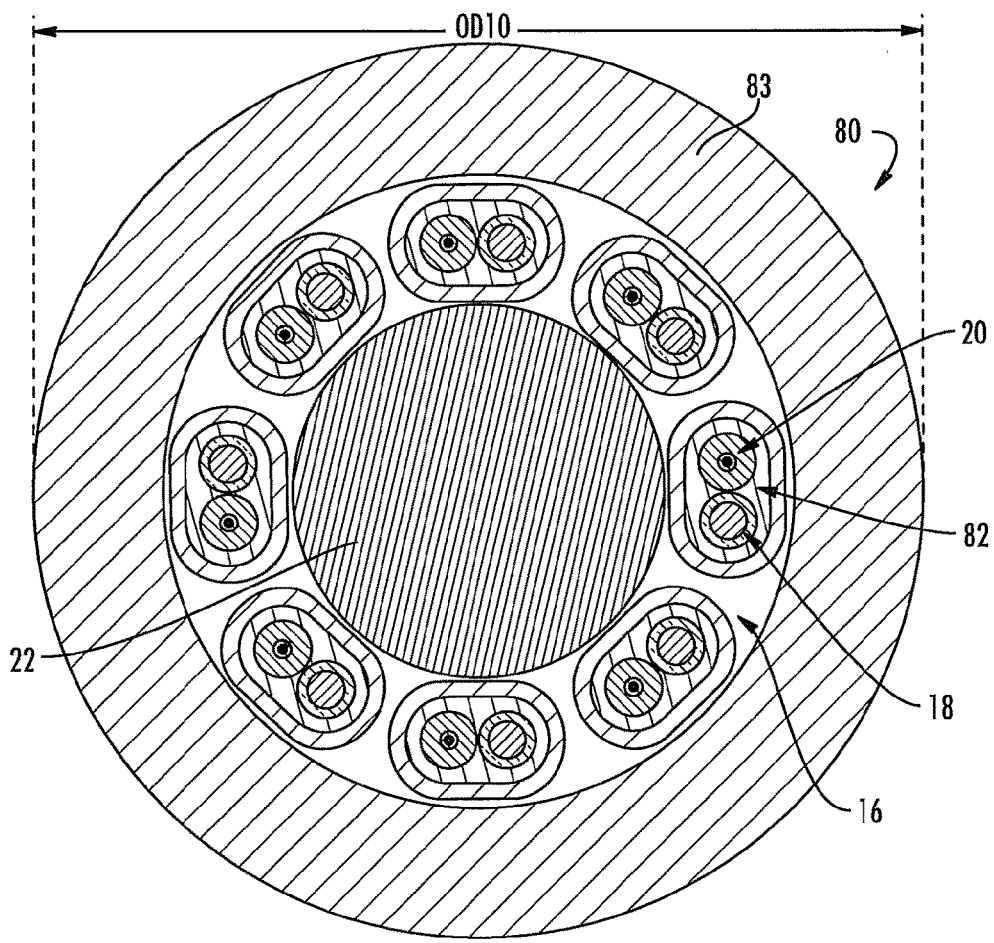
FIG. 8 is a cross-sectional view of an optical fiber cable according to another exemplary embodiment.

Referring generally to FIG. 8, an optical cable, shown as cable 80, is shown according to an exemplary embodiment. Cable 80 is substantially the same as cable 10 except as discussed herein. In general, within channel 16 of cable 80, large diameter optical fibers 18 and small diameter optical fibers 20 are located in a circumferentially extending layer in which large diameter optical fibers 18 and small diameter optical fibers 20 are next to each other and alternate within the layer. In general, the layer of fibers 18 and 20 extend in a generally circular path around central strength member 22. However, in contrast to cable 10, within cable 80 at least one large diameter optical fiber 18 and at least one of the adjacent small diameter optical fibers 20 are supported together within a common polymer ribbon body 82. As shown in the embodiment of FIG. 8, each ribbon body 82 includes one large diameter optical fiber 18 and one small diameter optical fiber 20, and cable 80 includes eight ribbon bodies 82 arranged in the circumferentially extending layer around strength member 22.

In general, each ribbon body 82 includes one or more common polymer layers that surround and support a pair of fibers 18 and 20. In various embodiments, ribbon body 82 provides structure to each pair of fibers 18 and 20 to facilitate handling and routing to the desired equipment after being split out of jacket 12. In various embodiments, ribbon body 82 may be a peelable ribbon configured to allow easy or toolless access to the fibers 18 and 20 within ribbon body 82.

In various embodiments, cable 80 has a cable jacket 83 that has an outer diameter shown as OD10, and in various embodiments, OD10 is between 11 mm and 16 mm, specifically between 13 mm and 14 mm and more specifically about 13.4 mm (e.g., 13.4 mm plus or minus 0.1 mm). Thus, in various embodiments, by providing fiber supporting structure within cable jacket 83 in the form of ribbon bodies 82, the overall outer diameter of cable 80 can be decreased relative to a cable, such as cable 50, that contains the same number of fibers.

Figure 9:
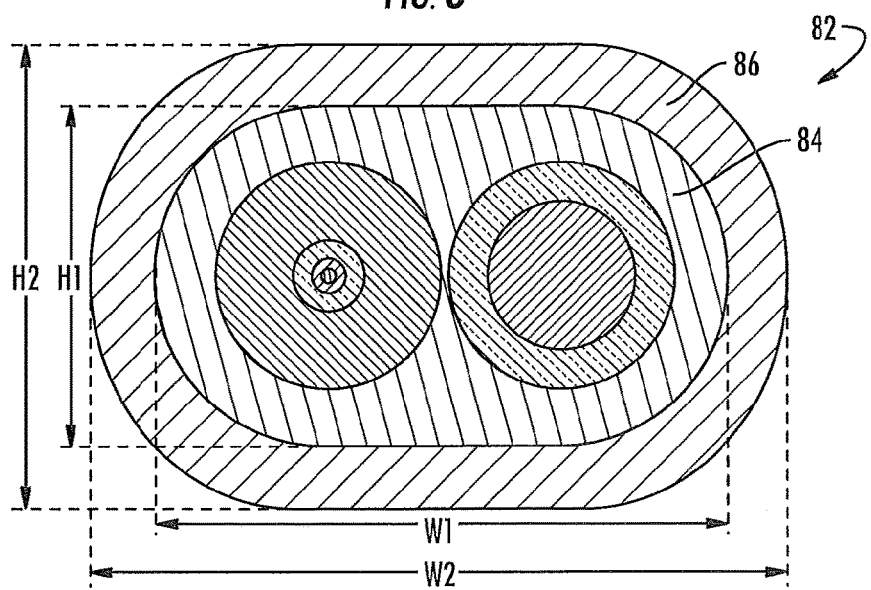
FIG. 9 is a cross-sectional view of an optical fiber ribbon unit according to an exemplary embodiment.

Referring to FIG. 9, ribbon body 82 is shown in more detail. In general, ribbon body 82 includes a first polymer layer, shown as inner layer 84, that surrounds and contacts both fibers 18 and 20 within ribbon body 82. Ribbon body 82 also includes a second polymer layer, shown as outer layer 86, that surrounds and contacts an outer surface of inner layer 84. In one embodiment, inner layer 84 is a relatively soft compliant polymer material, and outer layer 86 is a relatively stiff "rugged" material that facilitates handling of ribbon body 82 once split out from cable 80. In various embodiments, inner layer 84 is formed from any suitable hardness controlled UV curable polymer material and/or thermoplastic material, such as a thermoplastic elastomer material. In various embodiments, outer layer 86 is formed from a thermoplastic material and may include aramid yarn fibers embedded in outer layer 86. In one embodiment, inner layer 84 and outer layer 86 may be separated from each other with a sheath, and in such embodiments, aramid yarn fibers may be located between layers 84 and 86.

In various embodiments, ribbon body 82 is a relatively small structure surrounding fibers 18 and 20 such that the cross-section area of cable 80 is kept suitably small. In various embodiments, inner layer 84 has a width, shown as W1, and a height, shown as H1, and outer layer 86 has a width, shown as W2, and a height, shown as H2. In various embodiments, W1 is between 1.8 mm and 3 mm, specifically between 2 mm and 2.4 mm and more specifically about 2.2 mm (e.g., 2.2 mm plus or minus 0.1 mm). In various embodiments, H1 is between 0.9 mm and 2 mm, specifically between 1.1 mm and 1.5 mm and more specifically about 1.3 mm (e.g., 1.3 mm plus or minus 0.1 mm). In various embodiments, W2 is between 1.9 mm and 3.1 mm, specifically between 2.5 mm and 2.9 mm and more specifically about 2.7 mm (e.g., 2.7 mm plus or minus 0.1 mm). In various embodiments, H2 is between 1 mm and 2.5 mm, specifically between 1.6 mm and 2 mm and more specifically about 1.8 mm (e.g., 1.8 mm plus or minus 0.1 mm).

Figure 10:
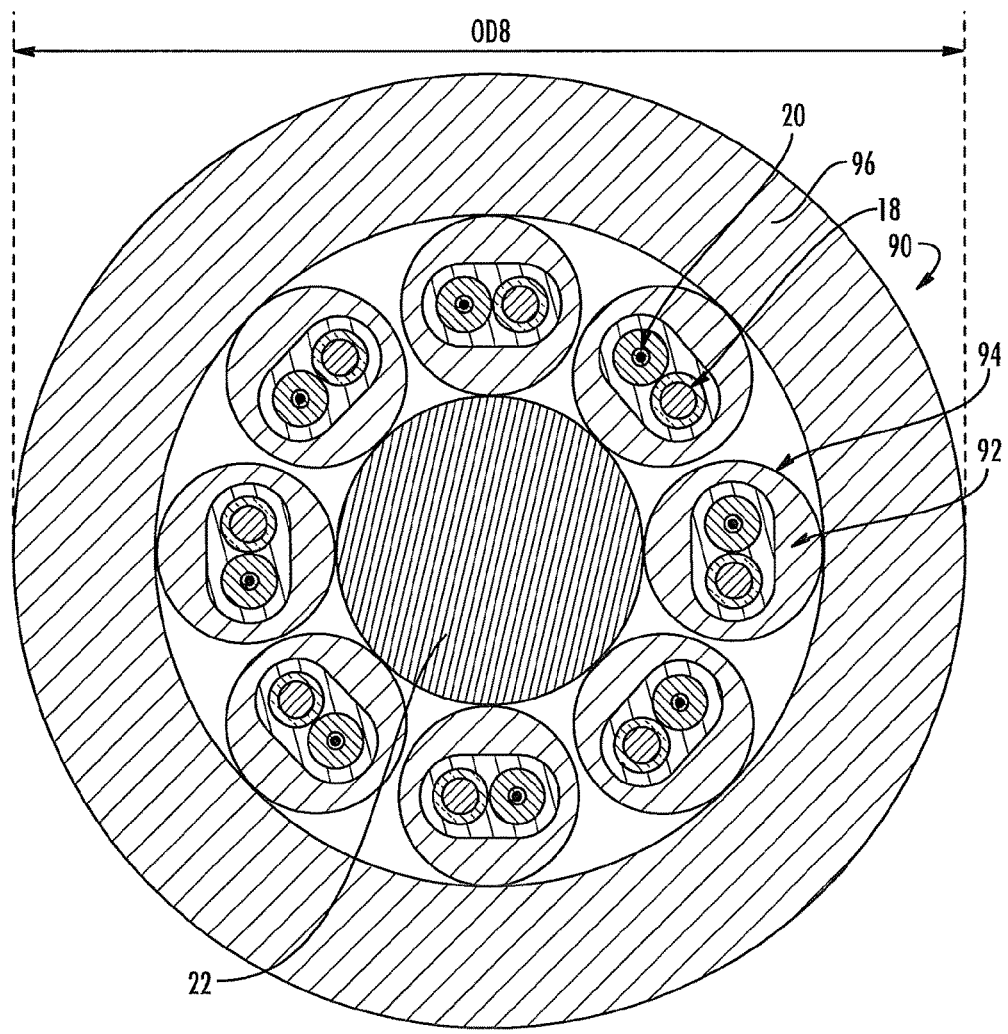
FIG. 10 is a cross-sectional view of an optical fiber cable according to another exemplary embodiment.

Referring generally to FIG. 10, an optical cable, shown as cable 90, is shown according to an exemplary embodiment. Cable 90 is substantially the same as cable 80 except as discussed herein. Within cable 90 at least one large diameter optical fiber 18 and at least one of the adjacent small diameter optical fibers 20 are supported together within a common polymer ribbon body 92. Ribbon body 92 is a two-layered ribbon body similar to ribbon body 82, except that ribbon body 92 includes a rounded (e.g., circular, elliptical, oval, etc.) outer surface 94. In various embodiments, rounded outer surface 94 may facilitate handling of the ribbon units of cable 90 by providing additional structure the user of cable 90 may grip with ease.

In various embodiments, cable 90 has a cable jacket 96 that has an outer diameter shown as OD8, and in various embodiments, OD8 is between 12 mm and 17 mm, specifically between 13.5 mm and 14.5 mm and more specifically is about 14.1 mm (e.g., 14.1 mm plus or minus 0.1 mm). Thus in various embodiments, by providing larger ribbon bodies 92 (as compared to ribbon bodies 82), the overall outer diameter of cable 90 is increased relative to a cable, such as cable 80, that contains the same number of fibers but includes a smaller type of ribbon body.

Figure 11:
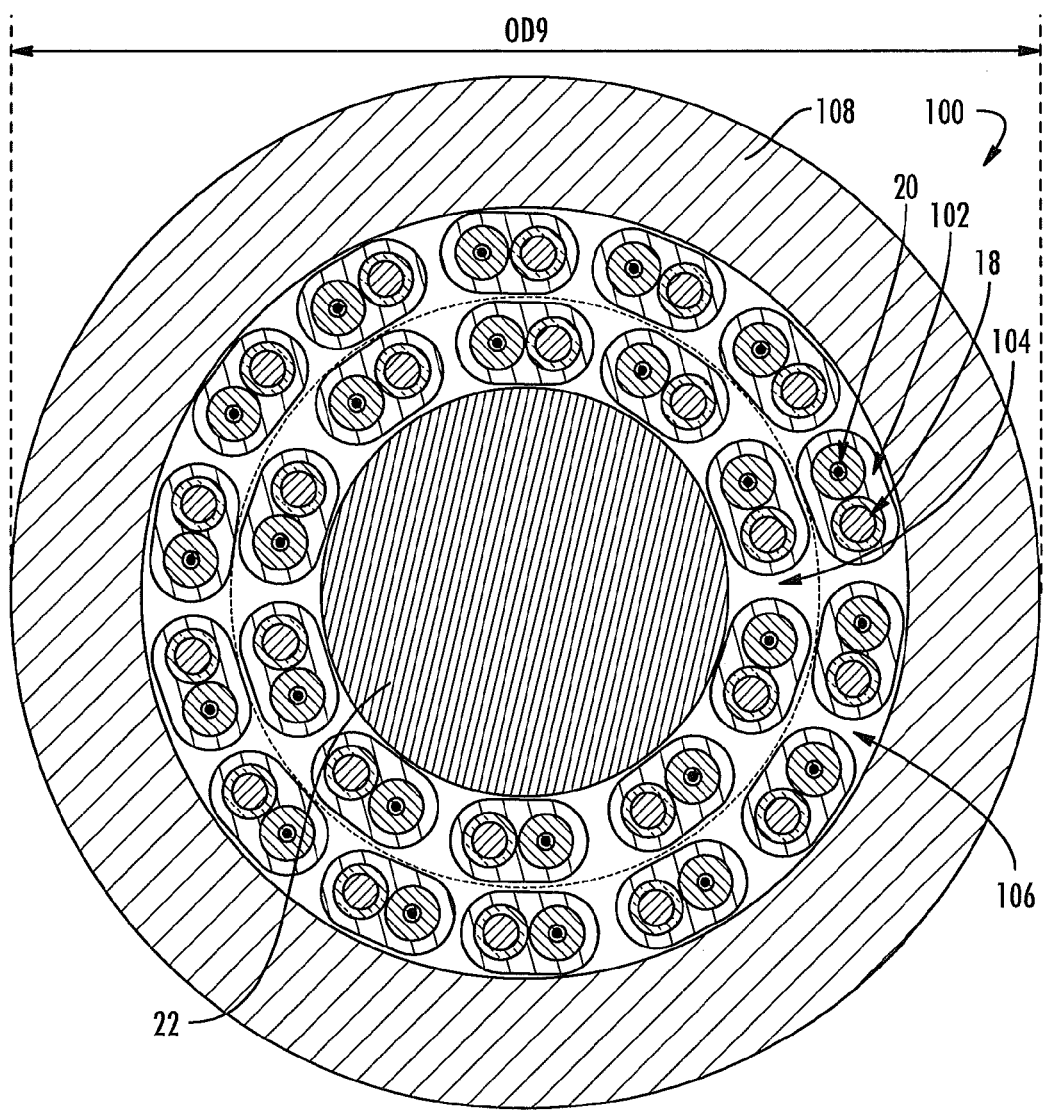
FIG. 11 is a cross-sectional view of an optical fiber cable according to another exemplary embodiment.

Referring generally to FIG. 11, an optical cable, shown as cable 100, is shown according to an exemplary embodiment. Cable 100 is substantially the same as cable 80 except as discussed herein. Within cable 100 at least one large diameter optical fiber 18 and at least one of the adjacent small diameter optical fibers 20 are supported together within a common polymer ribbon body 102. In contrast to ribbon bodies 82 and 92, discussed above, ribbon body 102 includes a single layer that is the same as inner layer 84 of ribbon body 82. In this embodiment, the size of ribbon body 102 is decreased by not including an outer layer 86, and ribbon body 102 also allows for easy access to fibers 18 and 20 within ribbon body 102. In addition, cable 100 includes an inner layer 104 of alternating large diameter fibers 18 and small diameter fibers 20 within ribbon bodies 102. Cable 100 also includes an outer layer 106 of alternating large diameter fibers 18 and small diameter fibers 20 within ribbon bodies 102 located outside of and surrounding inner layer 104. In this arrangement, cable 100 includes 24 large diameter optical fibers 18 and 24 small diameter optical fibers 20 located in pairs within 24 ribbon bodies 102.

In various embodiments, cable 100 has a cable jacket 108 that has an outer diameter shown as OD9, and in various embodiments, OD9 is between 13 mm and 18 mm, specifically between 15 mm and 16 mm and more specifically is about 15.5 mm (e.g., 15.5 mm plus or minus 0.1 mm). Thus in various embodiments, by providing smaller ribbon bodies 102 (as compared to ribbon bodies 82), the overall outer diameter of cable 100 may be smaller than otherwise needed in a cable including 48 total fibers and a ribbon body having a rugged outer layer, such as ribbon body 82.

Figure 12:
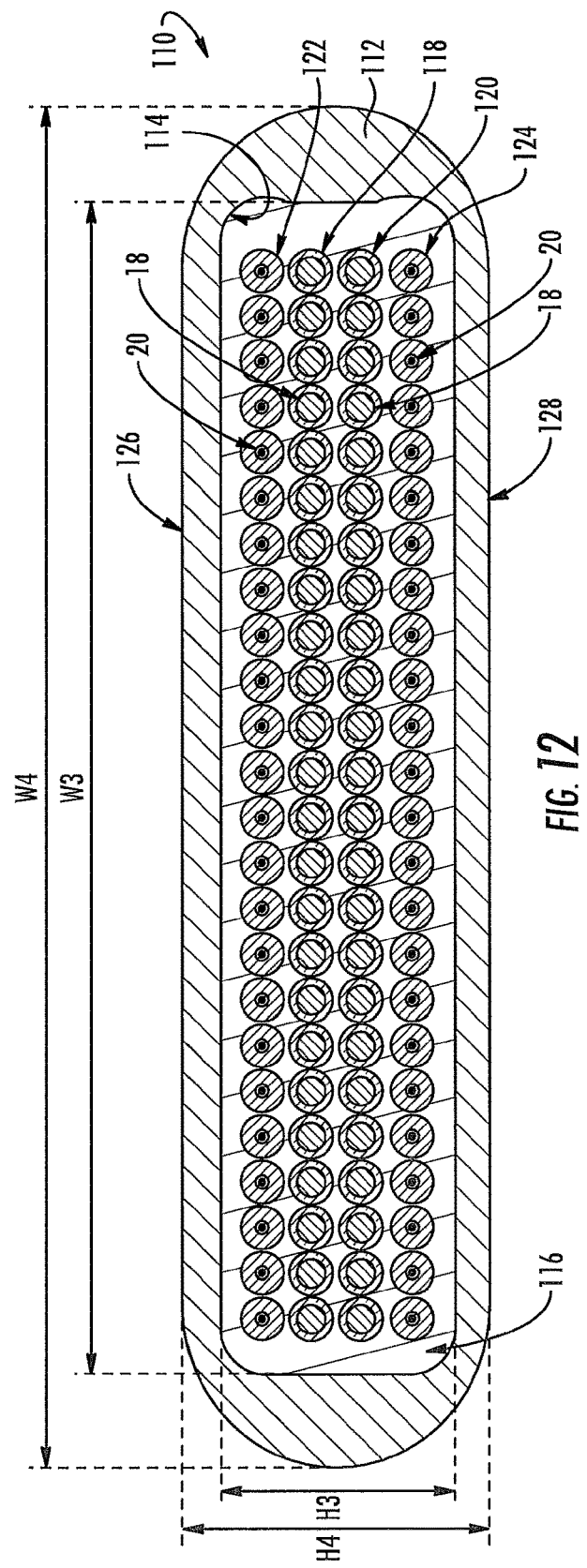
FIG. 12 is a cross-sectional view of an optical fiber cable according to another exemplary embodiment.

Referring to FIG. 12, an optical cable, shown as cable 110, is shown according to an exemplary embodiment. Cable 110 includes an outer body layer, shown as cable body or cable jacket 112, having an inner surface 114 that defines a channel, shown as central channel 116. In general, channel 116 includes a channel width, W3, and a channel height, H3, and W3 is greater than H3. In general, cable 110 includes a group of large diameter fibers 18 positioned in at least one row, shown as rows 118 and 120 first row 118, that is located in an interior region of channel 116. In general, rows 118 and 120 extend within channel 116 in the direction of the channel width represented by W3.

In general, cable 110 includes a group of small diameter fibers 20 positioned in at least one row, shown as rows 122 and 124, that is located in an outer region of channel 116. In general, rows 122 and 124 extend within channel 116 in the direction of the channel width represented by W3. In the embodiment, shown, row 122 is located between row 118 and inner surface 114 in the direction of the channel height represented by H3, and row 124 is located between row 120 and inner surface 114 in the direction of the channel height represented by H3. Thus, in this embodiment, fibers 18 and 20 form a pattern in which each large diameter fiber 18 of row 118 is located next to one of the small diameter fibers 20 of row 122 in the direction of the channel height represented by H3, and in which each large diameter fiber 18 of row 120 is located next to one of the small diameter fibers 20 of row 124 in the direction of the channel height represented by H3. In the exemplary embodiment shown, each fiber row of cable 110 includes 24 fibers and the total number of fibers within cable 110 is 96. In various embodiments, rows 122 and 124 of small diameter fibers 20 are located toward the outside of cable 110 and rows 118 and 120 of large diameter fibers 18 are located toward the center of cable 110 to reduce bending strain experienced by the fibers, particularly large diameter fibers 18, of cable 110.

In the specific embodiment shown, cable body 112 is an elongate structure defining an outer width, shown as W4, and an outer height, shown as H4. In various embodiments, W4 is at least twice H4 and more specifically is at least three times H4. Cable body 112 includes two substantially flat or planar outer surfaces extending in the direction of the channel width represented by W3, shown as upper surface 126 and lower surface 128. In the embodiment shown, surfaces 126 and 128 are substantially parallel (e.g., within plus or minus 10 degrees) to fiber rows 118, 120, 122 and 124 within channel 116. Thus, in this arrangement, cable 110 provides a substantially flat cable structure that provides good loading and crush resistance, particularly for forces applied perpendicular to surfaces 126 and 128. In various embodiments, cable 110 may be suitable for straight cable runs on top of the ground where vehicles may pass over cable 110.

In various embodiments, the dimensions of channel 116 and the outer dimensions of cable body 112 may be sized such that cable 110 can hold various numbers of fibers 18 and 20. In various embodiments, W3 is between 15 mm and 30 mm, specifically between 20 mm and 25 mm and more specifically about 23 mm (e.g., 23 mm plus or minus 0.1 mm). In various embodiments, H3 is between 2 mm and 10 mm, specifically between 3 mm and 5 mm and more specifically about 4.5 mm (e.g., 4.5 mm plus or minus 0.1 mm). In various embodiments, W4 is between 18 mm and 35 mm, specifically between 22 mm and 30 mm and more specifically about 26.5 mm (e.g., 26.5 mm plus or minus 0.1 mm). In various embodiments, H4 is between 3 mm and 12 mm, specifically between 5 mm and 8 mm and more specifically about 6.5 mm (e.g., 6.5 mm plus or minus 0.1 mm).

Figure 13:
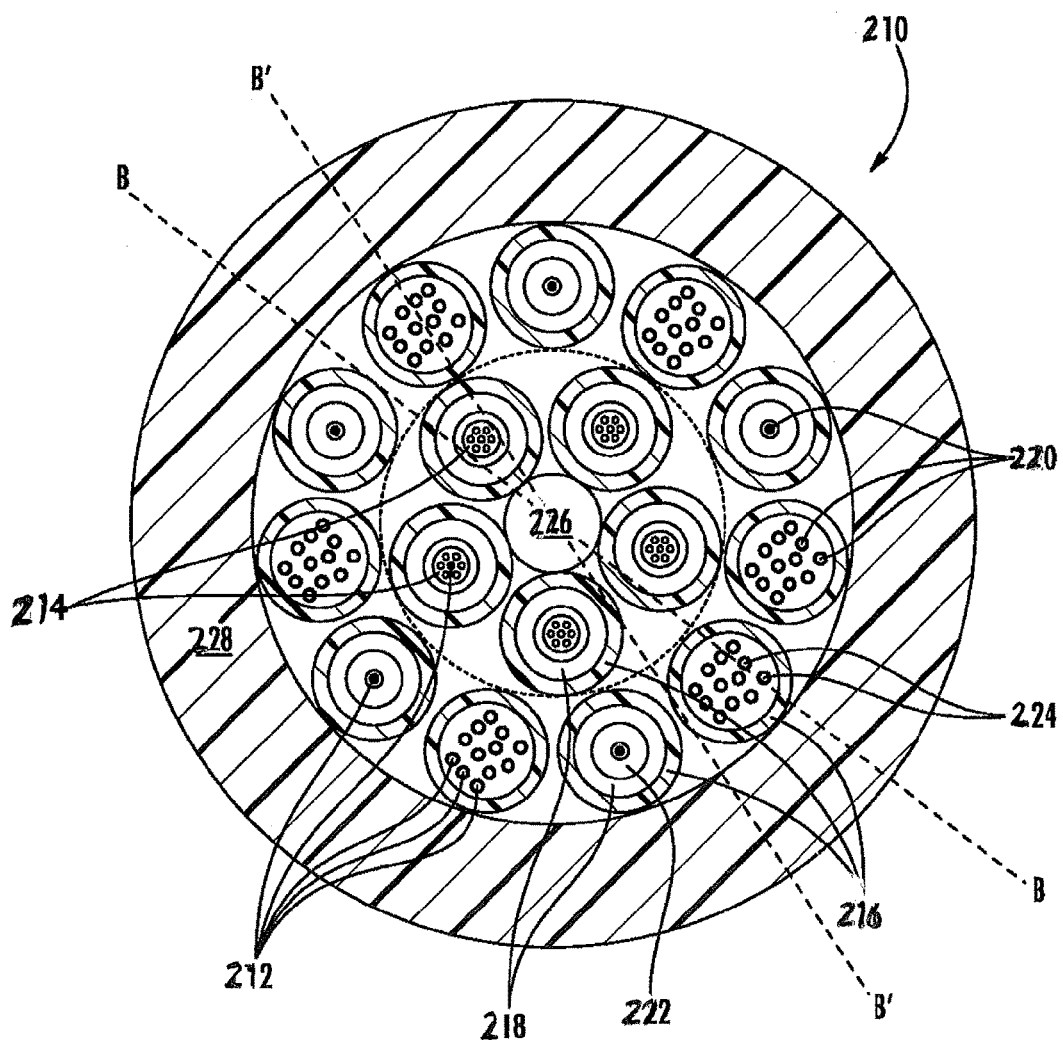
FIG. 13 is a cross-sectional view of a fiber optic cable according to an exemplary embodiment.

Referring to FIG. 13, a fiber optic cable, in the form of a loose tube cable or fan-out cable 210, includes optical fibers 212, such as large-diameter optical fibers 214. The optical fibers 212 may be single-mode, multi-mode, bend-insensitive, multi-core, large-core, stepped core, ribbon, tight-buffered, un-buffered, or other types or arrangements of optical fibers. For example, in some embodiments, the large-diameter optical fibers 214 are multi-core optical fibers.

According to an exemplary embodiment, the cable 210 further includes tubes 216, such as buffer tubes, micromodule sheathing, sub-unit jackets, or other tubes. The tubes 216 may support the optical fibers 212, such as subsets of the optical fibers 212. In some embodiments, the tubes 216 support different types of optical fiber 212 in different tubes 216. For example, some of the tubes 216 may support large-diameter optical fibers 214. In some embodiments, the only type of optical fibers supported by the tubes 216 that support the large-diameter optical fibers 214 are the large-diameter optical fibers 214. In some embodiments, the tubes 216 that support the large-diameter optical fibers 214 only support a single large-diameter optical fiber 214 per tube 216.

In some embodiments, the tubes 216 are formed from a polymeric material, such as primarily formed from a thermoplastic that may be extruded over the optical fiber(s) 212 supported thereby. In some embodiments, the tubes 216 include, such as primarily consist of by volume, at least one of the following: polyethylene, polyvinyl chloride, a low-smoke-zero-halogen material, polypropylene, polycarbonate, polybutylene terephthalate, or other materials. The tubes 216 may have a wall thickness of at least 0.2 mm, such as at least about 0.4 mm and/or less than 2 mm, such as less than about 1 mm. In some embodiments the tubes 216 have an outer diameter of 3 mm or less, such as 2.5 mm or less, such as about 2 mm±0.5 mm. In other embodiments, the tubes 216 are otherwise sized, shaped, and/or constructed.

In some embodiments, the optical fibers 212 include one or more glass cores, a glass cladding surrounding the core (s), and a polymeric coating directly attached to and overlaying the cladding. The polymeric coating of the optical fibers 212 may be an acrylate material, such as an ultraviolet light cured acrylate, and may include sub-layers of different relative elasticity/hardness, such as one for stress isolation and another for scratch protection, and/or an ink layer for coloring the optical fibers 212. In some embodiments, the large-diameter optical fibers 214 have a diameter (i.e., outer diameter of the polymeric coating) that is at least 400 micrometers, such as at least 500 micrometers, and, in some embodiments, at least 600 micrometers, and/or no greater than a centimeter. The cladding of the large-diameter optical fibers 214 is at least 175 micrometers in diameter, such as at least 200 micrometers, and/or even about 225 micrometers±25 micrometers in some embodiments. In some embodiments, the diameter of the cladding of the large-diameter optical fibers is less than 1 mm.

According to an exemplary embodiment, the tubes 216 may further include additional material 218 such as filling compound, such as water-blocking gel or grease. The additional material 218 may alternatively include water-swellable powder, such as super-absorbent polymer. In some embodiments, the additional material 218 may include strength members, such as aramid or fiberglass yarn or fibers. In some embodiments, the additional material 218 may include polyester yarn, such as polyester yarn impregnated with super-absorbent polymers. The additional material 218 may include a ripcord. In other contemplated embodiments, the cable 210 does not include tubes 216, and the optical fibers 212 are configured or arranged as disclosed herein with binder thread or without additional support.

Still referring to FIG. 13, in some embodiments the cable further includes smaller diameter optical fibers 220, such as optical fibers having a diameter of about 250 micrometers or less, and/or 250 micrometers±50 micrometers, and/or 200 micrometers±50 micrometers. Accordingly, in some embodiments, the large-diameter optical fibers 214 have at least twice as large of a diameter as the smaller-diameter optical fibers. Similar to the large-diameter optical fibers 216, the smaller-diameter optical fibers 220 may include a glass core, a glass cladding, and a polymeric layer directly adjacent to the cladding. The cladding of the smaller-diameter optical fibers 220 is less than 150 micrometers, such as less than 130 micrometers, such as 125 micrometers±25 micrometers in some embodiments.

In some embodiments, the smaller-diameter optical fibers may be tight buffered, such as with a layer of thermoplastic polymer (e.g., polyvinyl chloride or low-smoke-zero-halogen material) applied tightly over the polymeric coating of the optical fiber 220. For example, the optical fiber 220 may have a diameter (i.e., outer diameter of the polymeric coating) of about 250 micrometers, and the outer diameter of the tight buffer may be about 600 micrometers or even about 900 micrometers. The large-diameter optical fibers 214 may also be tight-buffered. With a tight buffer, the large- and smaller-diameter optical fibers 214, 220 may appear to be the same size, because the outer diameter of the tight buffer layer for both the large- and smaller-diameter optical fibers 214, 220 may be about the same size (e.g., about 900 micrometers, such as 900 micrometers±100 micrometers).

The smaller-diameter optical fibers 220 may be supported by (e.g., carried in, pass through) the tubes 216, such as some of the tubes 216 not occupied by the large-diameter optical fibers 216. In some embodiments, the tubes 216 supporting the smaller-diameter optical fibers 220 may support only a single one of the smaller-diameter optical fibers 220, such as a single tight-buffered optical fiber 222. In other embodiments, the tubes 216 supporting the smaller-diameter optical fibers 220 may support a plurality of the smaller-diameter optical fibers 220, such as at least two, at least four, at least twelve non-buffered optical fibers 224, meaning optical fibers that do not include a tight-buffer layer beyond the polymeric coating that surrounds the cladding thereof.

According to an exemplary embodiment, the tubes 216 of the fiber optic cable 210, and/or the optical fibers 212, which may be supported thereby, are stranded or wound with one another. The tubes 216 may be stranded in a repeating pattern of stranding, such as in a helical profile or in a reverse-oscillatory profile (e.g., so-called "SZ" stranding). Applicants have found that the large optical fibers 214 benefit from a relatively large lay length in stranding, where the lay length is the average lengthwise distance along the cable 210 for a complete revolution of one of the stranded element. For helical stranding, the lay length is the lengthwise distance for a full rotation; and for reverse-oscillatory stranding, the lay length is the number of turns between reversals divided by the lengthwise distance between reversals, which may be an average over 100 reversals if the number of turns varies between reversals. According to an exemplary embodiment, the lay length is between about 300 and 1000 millimeters, such as between 400 and 800 millimeters, such as about 500 millimeters±100 millimeters. While such lay lengths may be longer than many conventional cables, Applicants believe that stranding with such lay lengths provides a low-stress bend radius for the large-diameter optical fibers 214, while still providing good performance of the cable 210 in crush.

In some embodiments, the cable 210 further includes a central strength member 226 and/or a jacket 228. The tubes 216 may be stranded around the central strength member 226, which may include a dielectric material, such as glass-reinforced plastic, or another material, such as steel. In some embodiments, the central strength member 226 may be up-jacketed with a polymer, such as polyethylene or polyvinyl chloride, to size the radius for a particular number of tubes 216 stranded therearound. For example, the cable 210 may include at least two tubes 216, such as at least four tubes 216, such as at least ten tubes 216. In some embodiments, as shown in FIG. 13, the tubes 216 may be stranded around the central strength member 226 in layers of the tubes 216. According to an exemplary embodiment, the large-diameter optical fibers 214 are supported by tubes 216 in the innermost layer(s), thereby reducing bending stresses on the large-diameter optical fibers 214 as the cable 210 bends. Similar to the tubes 216, the jacket 228 may be formed from thermoplastic that may be extruded over the tubes 216 and/or any other contents of the cable 210, such as water-blocking tape, armor, aramid layer(s), etc. In some embodiments, the jacket 228 includes, such as primarily consist of by volume, at least one of the following: polyethylene, polyvinyl chloride, a low-smoke-zero-halogen material or other materials. In other contemplated embodiments, the cable 210 may not include a central strength member 226 and/or a jacket 228.

According to an exemplary embodiment, the tubes 216 are stranded around the central strength member 226, where the tubes 216 supporting the large-diameter optical fibers 214 are evenly dispersed around the central strength member 216, such that with any given bisection B, B' of the cross-section of the cable 210 (i.e., passing through the center of the central strength member 226) the difference in number of tubes 216 supporting the large-diameter optical fibers 214 between the bisected halves is one or less (i.e., the difference may be a fraction). In some embodiments, the tubes 216 supporting the smaller-diameter optical fibers 220 are also evenly dispersed around the central strength member 226 such that with any given bisection of the cross-section of the cable 210 the difference in number of tubes 216 supporting the smaller-diameter optical fibers 220 between the bisected halves is one or less. Even distribution of the different optical fibers 214 throughout the cross-section of the cable 210 is believe to balance strain loading of the optical fibers, which may be particularly beneficial to the large-diameter optical fibers 214. In other contemplated embodiments, tubes 216 containing large-diameter optical fibers 214 are placed between tubes 216 containing smaller-diameter optical fibers 214 in a single stranded layer to provide balanced strain loading.

In various embodiments, the cable jackets discussed herein may be made from a wide variety of materials used in cable manufacturing such as polyurethane, medium density polyethylene, polyvinyl chloride (PVC), polyvinylidene difluoride (PVDF), nylon, polyester or polycarbonate and their copolymers. In addition, the cable jackets discussed herein may include small quantities of other materials or fillers that provide different properties to the material of cable jacket. For example, the material of the cable jackets discussed herein may include materials that provide for coloring, UV/light blocking (e.g., carbon black), burn resistance, etc.

While the specific cable embodiments discussed herein and shown in the figures relate primarily to cables that have a substantially circular cross-sectional shape defining substantially cylindrical internal lumens, in other embodiments, the cables discussed herein may have any number of cross-section shapes. For example, in various embodiments, the cable jacket may have a square, rectangular, triangular or other polygonal cross-sectional shape. In such embodiments, the passage or lumen of the cable may be the same shape or different shape than the shape of the cable jacket and/or buffer tubes. In some embodiments, the cable jacket may define more than one channel or passage. In such embodiments, the multiple channels may be of the same size and shape as each other or may each have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In various embodiments, the optical fibers discussed herein may be any optical fiber type or class, including multi-mode fibers, single mode fibers, bend insensitive fibers, step index fibers, multi-core optical fibers, etc.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A large and small diameter optical fiber carrying cable comprising:
    a cable body including an inner surface defining a channel within the cable body;
    a first group of optical fibers comprising a plurality of first optical fibers located within the channel, wherein each of the first optical fibers comprises:
        an optical core having a first core diameter measured at a cross-sectional position;
        a cladding layer surrounding the optical core; and
        a polymer fiber coating layer located around the cladding layer;
    a second group of optical fibers comprising a plurality of second optical fibers located within the channel, wherein each of the second optical fibers comprises:
        an optical core having a second core diameter measured at the cross-sectional position;
        a cladding layer surrounding the optical core; and
        a polymer fiber coating layer located around the cladding layer;
    an elongate central strength member, wherein the first group of optical fibers and the second group of optical fibers are wrapped around the central strength member; and
    a plurality of polymer ribbon bodies, wherein at least one first optical fiber and at least one circumferentially adjacent second optical fiber are supported within each of the polymer ribbon bodies;
    wherein the first core diameter is larger than the second core diameter;
    wherein the first group of optical fibers and the second group of optical fibers are arranged within the channel such that each of the first optical fibers is next to at least one of the second optical fibers in at least one direction within the cable, wherein the first group of optical fibers and the second group of optical fibers are arranged such that each one of the first optical fiber is located between a pair of adjacent second optical fibers in the circumferential direction.

2. The cable of claim 1 wherein:
    each of the first optical fibers further comprises a first outer diameter measured between opposing outer surfaces of the polymer fiber coating layer;
    each of the second optical fibers further comprises a second outer diameter measured between opposing outer surfaces of the polymer fiber coating layer;
    wherein the difference between first outer diameter and the second outer diameter is less than 10%.

3. The cable of claim 1 in which the first core diameter is at least twice the second core diameter.

4. The cable of claim 3 wherein the first core diameter is greater than 400 micrometers.

5. The cable of claim 4 wherein first optical fibers are at least one of multicore optical fibers and a step index optical fibers.

6. The cable of claim 1 wherein the cable body includes an outer surface defining an outer cable diameter, wherein the outer cable diameter is between 6 mm and 18 mm.

7. The cable of claim 6 wherein the cable body includes a cable body thickness measured between the outer surface and the inner surface of the cable body, wherein the cable body thickness is between 0.5 mm and 4 mm.

* * * * *